United States Patent
Mitsuhashi et al.

(10) Patent No.: US 8,417,023 B2
(45) Date of Patent: Apr. 9, 2013

(54) IMAGE PLAYBACK DEVICE

(75) Inventors: Setsu Mitsuhashi, Tokyo (JP); Hirotake Nozaki, Port Washington, NY (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/226,772

(22) PCT Filed: Jun. 19, 2007

(86) PCT No.: PCT/JP2007/000644
§ 371 (c)(1),
(2), (4) Date: Oct. 28, 2008

(87) PCT Pub. No.: WO2007/148434
PCT Pub. Date: Dec. 27, 2007

(65) Prior Publication Data
US 2009/0103833 A1 Apr. 23, 2009

(30) Foreign Application Priority Data
Jun. 22, 2006 (JP) ................................ 2006-172496

(51) Int. Cl.
*G06K 9/00* (2006.01)
(52) U.S. Cl.
USPC ............ 382/154; 382/103; 382/285; 382/305
(58) Field of Classification Search ................... 382/108, 382/128, 154, 305; 600/424
See application file for complete search history.

(56) References Cited

U.S. PATENT DOCUMENTS

| | | | |
|---|---|---|---|
| 5,982,342 A * | 11/1999 | Iwata et al. ................... | 345/7 |
| 6,584,219 B1 * | 6/2003 | Yamashita et al. ............ | 382/154 |
| 7,031,554 B2 * | 4/2006 | Iwane ............................ | 382/305 |
| 7,386,153 B2 * | 6/2008 | Kim .............................. | 382/128 |
| 7,386,339 B2 * | 6/2008 | Strommer et al. ............ | 600/424 |
| 7,689,003 B2 * | 3/2010 | Shannon et al. .............. | 382/108 |
| 7,720,308 B2 * | 5/2010 | Kitaura et al. ................ | 382/285 |
| 7,756,324 B2 * | 7/2010 | Ohishi .......................... | 382/154 |
| 2005/0134945 A1 * | 6/2005 | Gallagher ..................... | 358/527 |
| 2005/0146521 A1 * | 7/2005 | Kaye et al. .................... | 345/419 |
| 2005/0248561 A1 * | 11/2005 | Ito et al. ....................... | 345/419 |

(Continued)

FOREIGN PATENT DOCUMENTS

| | | |
|---|---|---|
| JP | A-08-317425 | 11/1996 |
| JP | A-H11-164328 | 6/1999 |

(Continued)

OTHER PUBLICATIONS

Office Action issued in Japanese Patent Application No. 2006-172496 dated Nov. 22, 2011 (with translation).

(Continued)

*Primary Examiner* — Gregory M Desire
(74) *Attorney, Agent, or Firm* — Oliff & Berridge, PLC

(57) ABSTRACT

Conventionally, there has been a problem that a viewer is tired when playing back images mixedly including 2D images and 3D images, because images change frequently. A storage part stores 2D images and 3D images, an image conversion part that converts the 2D image stored in the storage part into a new 3D image, and an image output part that outputs the 3D image stored in the storage part and the new 3D image converted by the image conversion part. Consequently, it is possible to prevent a viewer from tiring when playing back images mixedly including 2D images and 3D images.

17 Claims, 14 Drawing Sheets

U.S. PATENT DOCUMENTS

| | | | |
|---|---|---|---|
| 2005/0264651 A1 | 12/2005 | Saishu et al. | |
| 2006/0126919 A1* | 6/2006 | Kitaura et al. | 382/154 |
| 2007/0248259 A1* | 10/2007 | Liu | 382/154 |
| 2012/0257083 A1* | 10/2012 | Komiyama et al. | 348/231.5 |

FOREIGN PATENT DOCUMENTS

| | | |
|---|---|---|
| JP | A-11-191895 | 7/1999 |
| JP | A-2002-218217 | 8/2002 |
| JP | A-2003-259395 | 9/2003 |
| JP | A-2004-120176 | 4/2004 |
| JP | A-2004-159048 | 6/2004 |
| JP | A-2004-163998 | 6/2004 |
| JP | A-2005-006114 | 1/2005 |
| JP | A-2005-094145 | 4/2005 |
| JP | A-2005-130021 | 5/2005 |
| JP | A-2005-229291 | 8/2005 |
| JP | A-2005-258222 | 9/2005 |
| JP | A-2005-331844 | 12/2005 |

OTHER PUBLICATIONS

Japanese Office Action dated Feb. 14, 2012 for Japanese Patent Application No. 2006-172496 (with translation).

* cited by examiner

| name | size | type | date and time | |
|---|---|---|---|---|
| abc.2D | 250kB | 2Dimage | 2006/5/1 9:50 | |
| def.3D | 510kB | 3Dimage | 2006/5/1 12:15 | |
| ghi.3D | 580kB | 3Dimage | 2006/5/1 18:30 | 801 |
| jkl.2D | 380kB | 2Dimage | 2006/5/2 9:10 | |
| mno.2D | 290kB | 2Dimage | 2006/5/3 7:30 | |
| pqr.3D | 620kB | 3Dimage | 2006/5/5 12:45 | |

Fig. 6(a)

| name | size | type | date and time | |
|---|---|---|---|---|
| def.3D | 510kB | 3Dimage | 2006/5/1 12:15 | 803 |
| ghi.3D | 580kB | 3Dimage | 2006/5/1 18:30 | |
| pqr.3D | 620kB | 3Dimage | 2006/5/5 12:45 | |
| abc.2D | 250kB | 2Dimage | 2006/5/1 9:50 | 802 |
| jkl.2D | 380kB | 2Dimage | 2006/5/2 9:10 | |
| mno.2D | 290kB | 2Dimage | 2006/5/3 7:30 | |

Fig. 6(b)

| name | size | type | date and time | |
|---|---|---|---|---|
| def.3D | 510kB | 3Dimage | 2006/5/1 12:15 | 805 |
| pqr.3D | 620kB | 3Dimage | 2006/5/5 12:45 | 806 |
| abc.2D | 250kB | 2Dimage | 2006/5/1 9:50 | |
| jkl.2D | 380kB | 2Dimage | 2006/5/2 9:10 | |
| mno.2D | 290kB | 2Dimage | 2006/5/3 7:30 | 804 |
| ghi.3D | 580kB | 3Dimage | 2006/5/1 18:30 | |

Fig. 6(c)

|       |        |         |          |
|-------|--------|---------|----------|
| name  | size   | type    | date     |
| abc.2D | 250kB | 2Dimage | 2006/5/1 |
| def.3D | 510kB | 3Dimage | 2006/5/1 |
| ghi.3D | 580kB | 3Dimage | 2006/5/1 |
| jkl.2D | 380kB | 2Dimage | 2006/5/2 |
| mno.2D | 290kB | 2Dimage | 2006/5/3 |
| pqr.3D | 620kB | 3Dimage | 2006/5/5 |

Fig. 12(a)

|       |        |         |          |
|-------|--------|---------|----------|
| name  | size   | type    | date     |
| abc.2D | 250kB | 2Dimage | 2006/5/1 |
| def.3D | 510kB | 3Dimage | 2006/5/1 |
| ghi.3D | 580kB | 3Dimage | 2006/5/1 |
| jkl.2D | 380kB | 2Dimage | 2006/5/2 |
| mno.2D | 290kB | 2Dimage | 2006/5/3 |
| pqr.3D | 620kB | 3Dimage | 2006/5/5 |

Fig. 12(b)

|       |        |         |          |
|-------|--------|---------|----------|
| name  | size   | type    | date     |
| abc.2D | 250kB | 2Dimage | 2006/5/1 |
| def.3D | 510kB | 3Dimage | 2006/5/1 |
| ghi.3D | 580kB | 3Dimage | 2006/5/1 |
| jkl.2D | 380kB | 2Dimage | 2006/5/2 |
| mno.2D | 290kB | 2Dimage | 2006/5/3 |
| pqr.3D | 620kB | 3Dimage | 2006/5/5 |

Fig. 12(c)

| name | size | type | date | |
|---|---|---|---|---|
| abc.2D | 250kB | 2D image | 2006/5/1 | |
| def.3DL | 260kB | 3D image | 2006/5/1 | ← 832 |
| def.3DR | 250kB | 3D image | 2006/5/1 | ← 833 |
| jkl.2D | 380kB | 2D image | 2006/5/2 | |
| mno.2D | 290kB | 2D image | 2006/5/3 | |

IMAGE PLAYBACK DEVICE

CROSS-REFERENCE TO RELATED APPLICATION

This application is a U.S. National State Application claiming the benefit of prior filed International Application Number PCT/JP2007/000644, filed Jun. 19, 2007, in which the International Application claims a priority date of Jun. 22, 2006 based on prior filed Japanese Application Number 2006-172496, the entire contents of which are incorporated herein by reference.

TECHNICAL FIELD

The present invention relates to an image playback device that plays back images stored mixedly including 2D images and 3D images.

BACKGROUND ART

Conventionally, an image playback device that plays back a 3D (three-dimensional) image using two parallax images is known. A method of playing back images stored mixedly including 3D images and 2D (plane) images in such an image playback device by separating the 3D images and the 2D images into different files is considered (for example, refer to Patent Document 1).

Patent Document 1: Japanese Unexamined Patent Application Publication No. 2005-94145

DISCLOSURE

Problems to be Solved

The related art has a problem that a viewer is tired when playing back images stored mixedly including 2D images and 3D images because images change frequently.

The above-mentioned problem being taken into consideration, a proposition of the present invention is to provide an image playback device that will not tire a viewer when playing back images stored mixedly including 2D images and 3D images.

Means for Solving the Problems

An image playback device according to the present invention is characterized by including a storage part that stores a 2D image and a 3D image, an image conversion part that converts the 2D image stored in the storage part into a new 3D image, and an image output part that outputs the 3D image stored in the storage part and the new 3D image converted by the image conversion part.

In particular, the image output part is characterized by outputting an image along with information indicative of that the image is a converted image when the image is one of a 3D image converted from a 2D image and a 2D image converted from a 3D image.

The image playback device is also characterized by including a storage part that stores a 2D image and a 3D image, a sorting part that sorts the 2D image and the 3D image stored in the storage part, and an image output part that outputs the 2D image and the 3D image according to an order of sorting result by the sorting part.

The image playback device is also characterized by including a storage part that stores a 2D image and a 3D image and an image output part that has at least two kinds of image effect when outputting an image and outputs an image using the different kinds of image effect for the 2D image and the 3D image.

The image playback device is also characterized by including a storage part that stores a 2D image and a 3D image and an image output part that outputs an image in such a manner that the 3D image immediately after the point of changing from the 2D image to the 3D image is gradually turning into the 3D image after outputting it as a 2D image.

In particular, the image output part is characterized by inserting a third image before outputting an image at the point of changing between the 2D image and the 3D image.

The image playback device is also characterized by including a storage part that stores a 2D image and a 3D image and an image output part that changes, before outputting the 2D image and the 3D image stored in the storage part in a thumbnail or outputting a plurality of images on one screen, the images to those of the same type, one of the 2D image and the 3D image.

Further, the image playback device is characterized by including a storage part that stores a 2D image and a 3D image made up of a pair of parallax images, an image search part that searches for an image by taking only one of the pair of parallax images of the 3D image as a retrieval object, and an image output part that outputs the image that the image search part has searched for. Alternatively, the image playback device is characterized by providing an image search part that searches for the pair of parallax images of the 3D image as two distinct images.

The image playback device is also characterized by including a storage part that stores a 2D image and a 3D image and an image output part that outputs a folder in which each image stored in the storage part is stored as an icon, in which the image output part outputs different icons for a folder in which only 2D images are stored, a folder in which only 3D images are stored, and a folder in which 2D images and 3D images exist mixedly.

Further, the image playback device is characterized by including a storage part that stores a 2D image and a 3D image, an image output part that outputs the 3D image and the 2D image stored in the storage part, and an image selection part that selects only one of the 2D image and the 3D image stored in the storage part.

Effects

According to the present invention, it is possible not to tire a viewer when playing back images stored mixedly including 2D images and 3D images by controlling the conversion and sorting of images, changing of images, etc. Alternatively, it is possible to make easier to see a thumbnail display or a display of a plurality of images and make easier to search for or select a 2D image or 3D image.

BRIEF DESCRIPTION OF THE DRAWINGS

FIGS. 6(a) to 6(c) are explanatory diagrams showing how image files are sorted.

FIGS. 12(a) to 12(c) are explanatory diagrams showing a file operation of the image playback device 101 according to the third embodiment.

FIG. 13 is an explanatory diagram showing a configuration of a 3D image file.

DETAILED DESCRIPTION OF THE EMBODIMENTS

An image playback device according to the present invention is explained below with reference to the drawings.

First Embodiment

Figure 1:
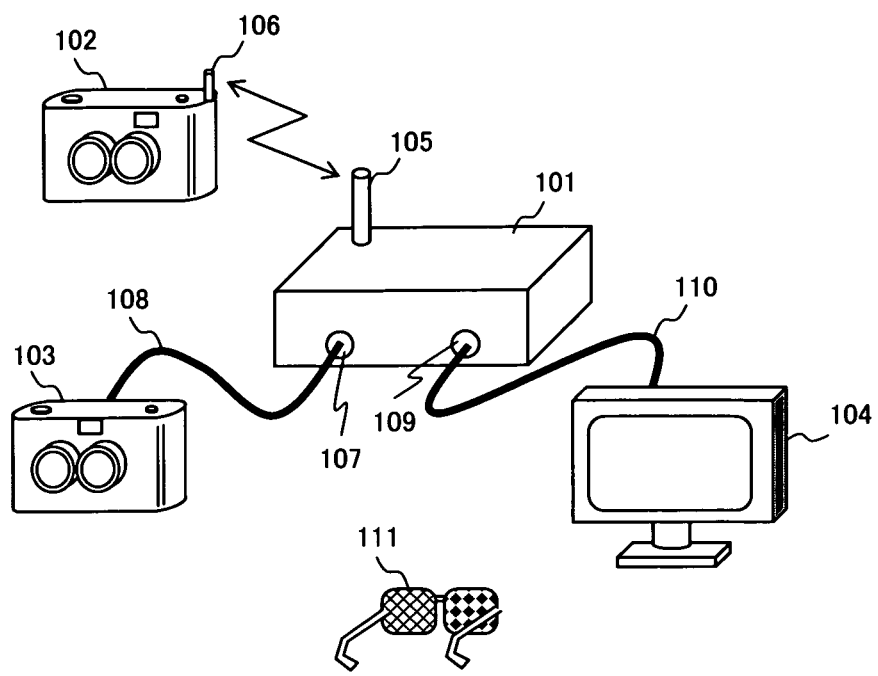
FIG. 1 is an explanatory diagram showing how an image playback device 101 according to a first embodiment is used.

FIG. 1 is a diagram showing an example of a use of the image playback device 101 according to a first embodiment of the present invention. The image playback device 101 is also called storage equipment, which takes in an image taken by the camera 102 or the camera 103 in a storage device, such as a hard disk, and outputs the taken-in images on a television 104 in a slide show etc.

The camera 102 is a camera for which wireless connection is possible and by way of wireless communication between an antenna 105 of the image playback device 101 and an antenna 106 of the camera 102, an image taken by the camera 102 is input to the image playback device 101.

The camera 103 is coupled with a USB (Universal Serial Bus) interface 107 of the image playback device 101 via a USB cable 108 and an image taken by the camera 103 is input to the image playback device 101. The camera 102 and the camera 103 are capable of taking not only a 2D image (plane image) but also a 3D image (three-dimensional image).

The image playback device 101 takes in a 2D image or a 3D image from the camera 102 or the camera 103 and outputs the 2D image and the 3D image from an output terminal 109 to the television 104 via a video cable 110 for display. It is possible to see the 3D image in the present embodiment as a 3D image by wearing 3D eyeglasses 111.

Figure 2:
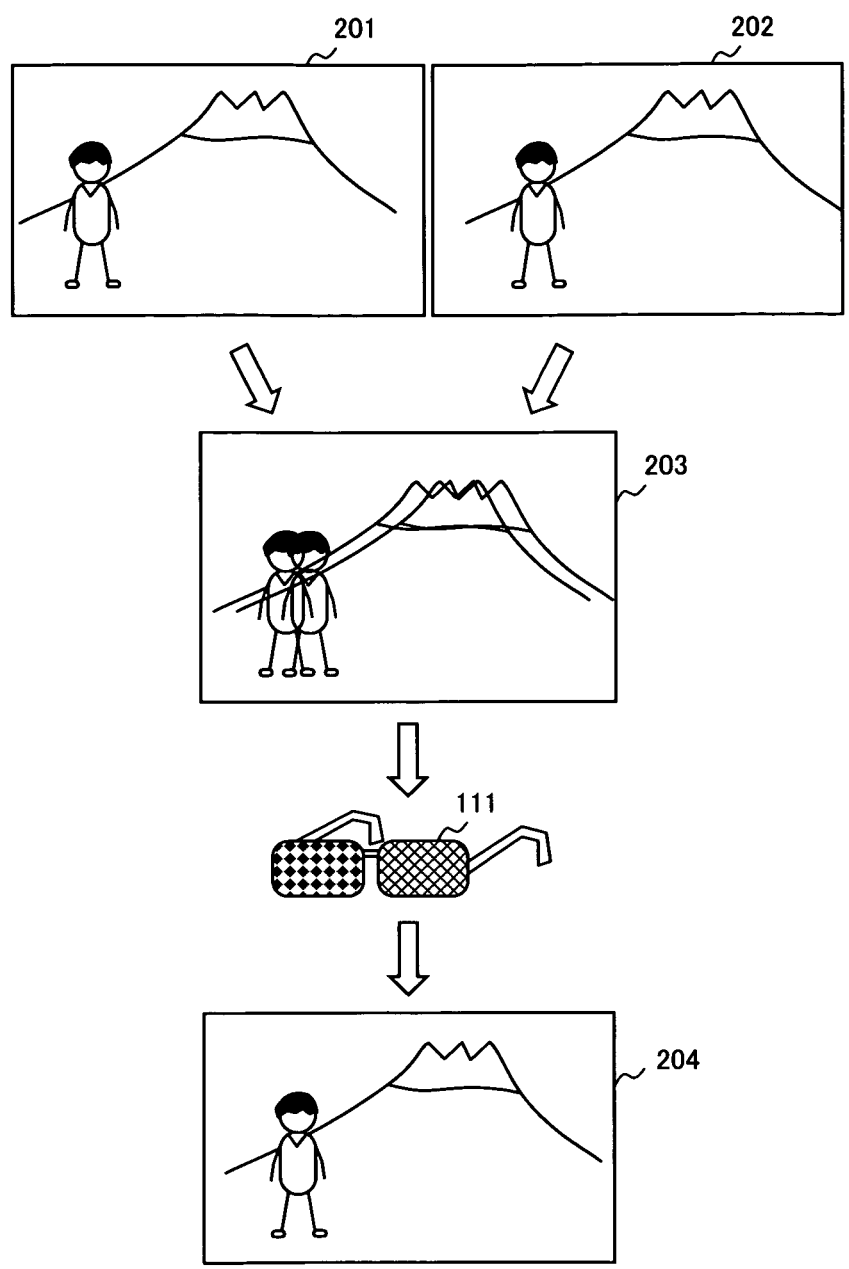
FIG. 2 is an explanatory diagram for explaining a 3D image.

Here, a 3D image used in the present embodiment is briefly explained using FIG. 2. In FIG. 2, it is assumed that the 3D image is made up of two parallax images, that is, an image 201 for the left eye and an image 202 for the right eye taken by the camera 102 or the camera 103. For example, an image 203 is synthetically displayed on the television 104 by the image 201 in red and the image 202 in blue. Because there is a parallax between the two synthetically displayed images, they appear double, but if a viewer sees the image 203 displayed on the television 104 with the 3D eyeglasses 111 worn, he/she can see a single 3D image 204. This is explained briefly. By providing a blue filter to the left eyeglass of the 3D eyeglasses 111 and a red filter to the right eyeglass, the left eye cannot see the blue image 202 for the right eye because of filtering and conversely, the right eye cannot see the red image 201 for the left eye also because of filtering, and as a result, the left eyes can see the image 201 for the left eye and the right eye can see the image 202 for the right eye, respectively, and they are recognized as a 3D image in mind. As described above, a 3D image needs a pair of parallax images for the left eye and the right eye, respectively.

Figure 3:
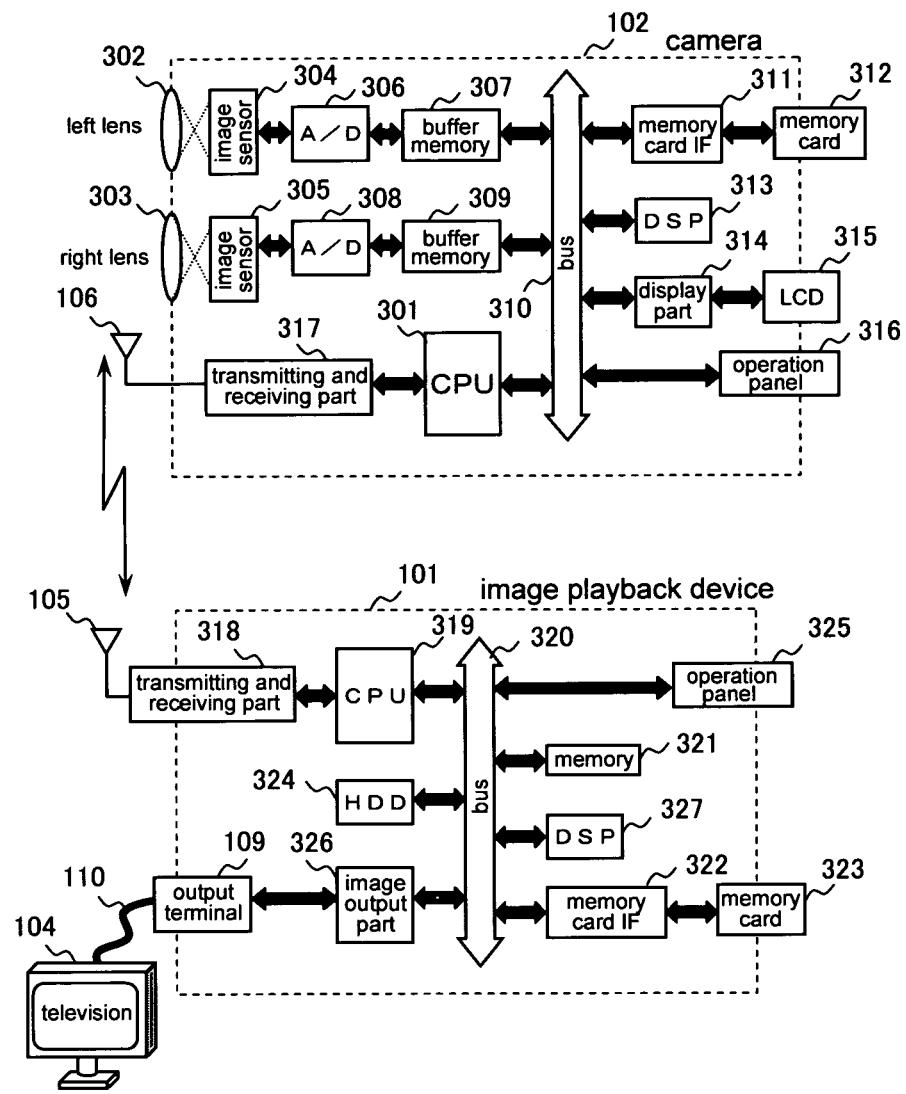
FIG. 3 is a block diagram showing a configuration of a camera 102 and the image playback device 101.

Next, the configuration of the camera 102 and the image playback device 101 in FIG. 1 is explained using FIG. 3. The camera 102 can take a 3D image and has a left lens 302 and a right lens 303 so as to be able to take a pair of parallax images for the left eye and the right eye, respectively. Light from subject incident through the left lens 302 is subjected to photoelectric conversion in an image sensor 304 and an electric signal having been subjected to the photoelectric conversion is further converted into digital data in an A/D (Analog to Digital) conversion part 306 and is taken in by a buffer memory 307. Similarly, light from subject incident through the right lens 303 is subjected to photoelectric conversion in an image sensor 305 and an electric signal having been subjected to the photoelectric conversion is further converted into digital data in an A/D conversion part 308 and is taken in by a buffer memory 309.

The image data taken in by the buffer memories 307 and 309 is read by a CPU 301 via a bus 310 and subjected to image processing in a DSP (Digital Signal Processing part) 313 and can be saved in a memory card 312 via a memory card IF (interface) 311.

The camera 102 is controlled by software of the CPU 301 and a user issues various operation instructions from an operation panel 316 to the CPU 301. For example, a user issues operation instructions to the CPU 301, such as shutter operation, changing between taking a 2D picture and taking a 3D picture, reading and saving of an image from and to the memory card 312, transmission of an image to the image playback device 101, etc.

A transmitting and receiving part 317 is used for wireless transmission of an image from the camera 102 to the image playback device 101 and modulates an image selected by a user using the operation panel 316 into a high-frequency signal and transmits it from the antenna 106 to the antenna 105 of the image playback device 101.

Next, the configuration of the image playback device 101 is explained. The image playback device 101 is controlled by software of a CPU 319 and a user issues various operation instructions to the CPU 319 from an operation panel 325. For example, operation instructions, such as, taking in an image from the camera 102, a file operation, such as confirmation or search of an image stored in a memory card 323 or a hard disk (HDD: Hard Disc Drive) 324, and execution of a slide show, are issued to the CPU 319.

An image received by a transmitting and receiving part 318 is stored by the CPU 319 in a memory 321 or the HDD 324 via a bus 320 or in the memory card 323 coupled via a memory card IF 322.

A DSP (Digital Signal Processing part) 327 carries out image processing based on the instruction by the CPU 319 and converts a 2D image into a pseudo 3D image by calculation or conversely converts a 3D image into a 2D image.

An image output part 326 converts an image output via the bus 320 into a video signal, such as a composite, component, DVI, and HDMI, and outputs it to the television 104 via the video cable 110 coupled to the output terminal 109, and thus an image is displayed on the television 104.

Figure 4:
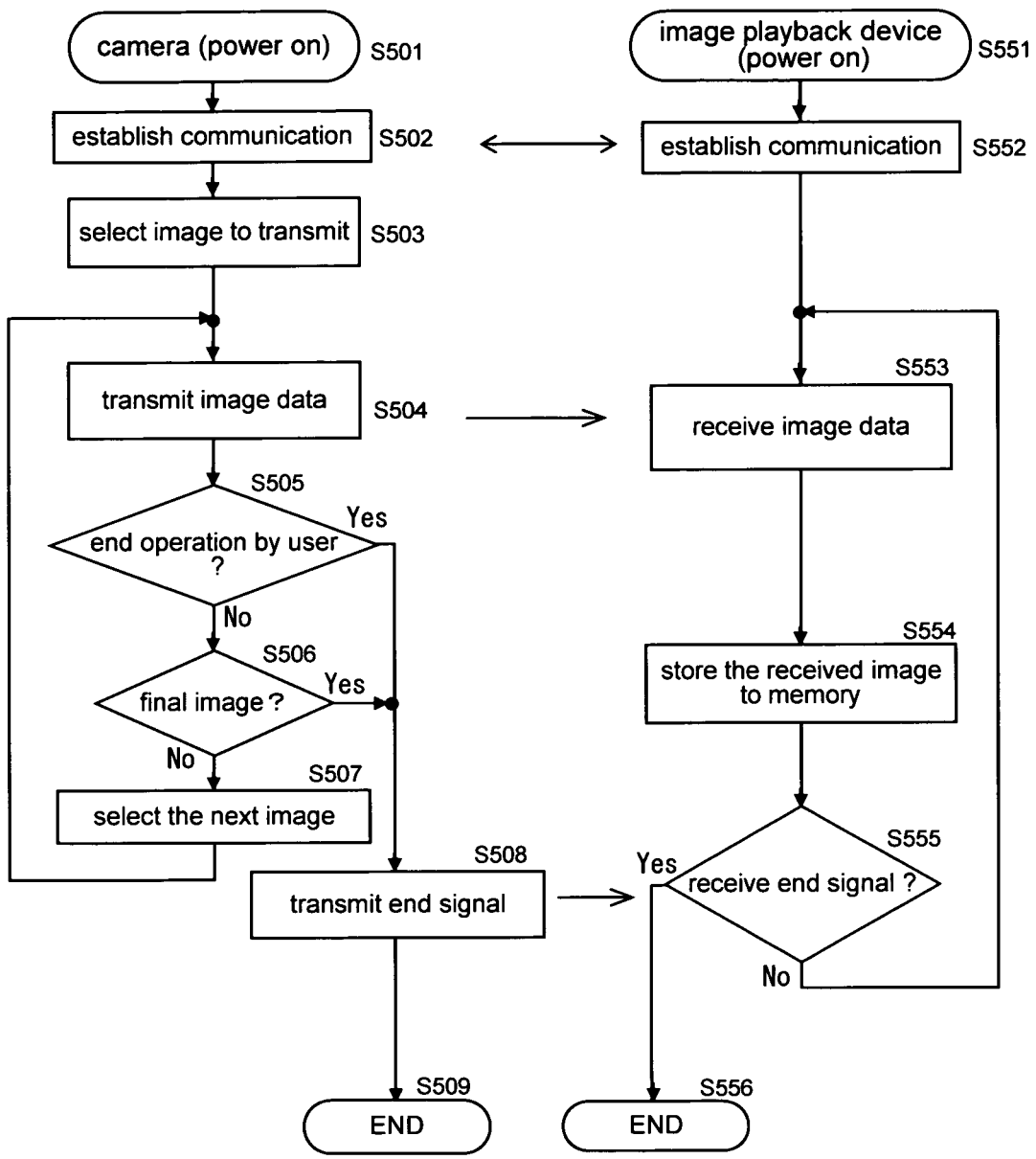
FIG. 4 is a flowchart showing a communication operation between the camera 102 and the image playback device 101.

Here, the processing of the CPU 301 and the CPU 319 when establishing communication between the transmitting and receiving part 317 of the camera 102 and the transmitting and receiving part 318 of the image playback device 101 and taking in an image in the memory 321 is explained using the flowchart in FIG. 4.

First, the operation of the camera 102 is explained.

(Step S501) The power supply of the camera 102 is turned on.

(Step S502) The CPU 301 of the camera 102 transmits a connection start signal from the transmitting and receiving part 317 and the antenna 106 and when a response signal is received from the image playback device 101, a state is brought about where communication has been established.

(Step S503) A user selects an image to transmit from among photographic images stored in the memory card 312 using the operation panel 316.

(Step S504) When images to transmit are selected, the selected images are transmitted in an order.

(Step S505) Whether or not the user has operated the operation panel 316 to end the operation before all of the selected images are transmitted is determined and when the operation is ended, the flowchart proceeds to S508.

(Step S506) Whether or not all of the selected images are transmitted is determined and when all images are transmitted, the flowchart proceeds to step S508.

(Step S507) An image to transmit next is selected from among the selected images and the flowchart returns to step S504.

(Step S508) The image playback device 101 is informed of that the image transmission processing is ended.

(Step S509) The image transmission processing is ended.

As described above, the images selected by the camera 102 are transmitted to the side of the image playback device 101. Next, the operation of the image playback device 101 is explained.

(Step S551) The power supply of the image playback device 101 is turned on.

(Step S552) Upon receipt of a start signal sent from the side of camera 102, the CPU 319 of the image playback device 101 transmits a response signal via the transmitting and receiving part 318 and the antenna 105 and a state is brought about where communication with the side of the camera 102 has been established.

(Step S553) An image sent from the camera 102 is received.

(Step S554) The received image is stored in the memory 321 or the HDD 324, or in the memory card 323.

(Step S555) Whether or not an end signal is received from the side of the camera 102 is determined and when an end signal is not received yet, the flowchart returns to step S553 and the next image is received.

(Step S556) When an end signal is received from the side of the camera 102, the image receiving processing is ended.

As described above, an image sent from the side of the camera 102 is received by the image playback device 101 and stored in the memory 321 or the HDD 324, or in the memory card 323. The image to transmit/receive may be a 2D image or a 3D image.

Figure 5:
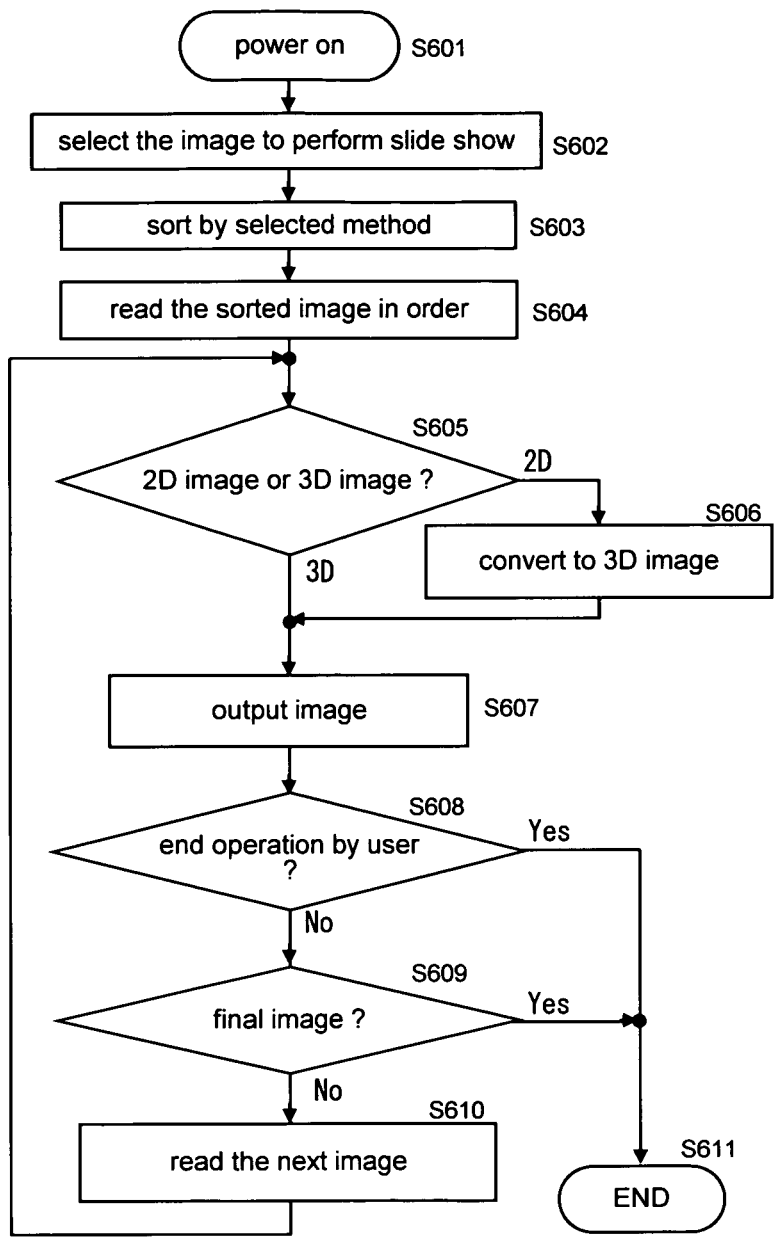
FIG. 5 is a flowchart showing an operation when a slide show is carried out in the image playback device 101.

Next, the operation when a slide show is displayed by the image playback device 101 is explained using FIG. 5. In the slide show, the images are sorted by a specified method and then displayed in an order. A 2D image is converted into a 3D image for display.

(Step S601) The power supply of the image playback device 101 is turned on.

(Step S602) Images to be displayed in the slide show are selected from among the images stored in the memory 321 or the HDD 324, or in the memory card 323 using the operation panel 325 of the image playback device 101. For example, by selecting a folder in the HDD 324, a slide show of all of the images stored in the folder is displayed.

(Step S603) The selected images are sorted by a specified method. For example, it is assumed that an image list 801 in FIG. 6(a) is selected. When sorting is carried out according to 3D images and 2D images in the image list 801, an order of display in a slide show is obtained as that shown in an image list 802 in FIG. 6(b), where three 3D images 803, that is, def.3D, ghi.3D, and pqr.3D, are displayed first and then three 2D images, that is, abc.2D, jkl.2D, and mno.2D, are displayed. Alternatively, when sorting is carried out according to the shooting time zone of every hour, an order of display in a slide show as that shown in an image list 804 in FIG. 6(c) is obtained, where two images 805, that is, def.3D and pqr.3D, taken between 12:00 and 13:00 are grouped and displayed in serial order and two images 806, abc.2D and jkl.2D, taken between 9:00 and 10:00 are grouped and displayed in serial order. The sorting may be carried out according to, for example, shooting date and time, file names, etc., other than those described above.

(Step S604) The images sorted in step S603 are read in order.

(Step S605) Whether the read image is a 2D image or a 3D image is determined and when it is a 2D image, the flowchart proceeds to step S606.

(Step S606) The DSP 327 converts the 2D image into a pseudo 3D image based on a predetermined calculation. There are proposed various conversion methods from 2D image to 3D image, including, for example, a method of forming two pseudo parallax images by partially varying a ratio of shift between images.

At this time, a character "2D->3D" is superimposed on a 3D image after conversion so that a viewer can see that the 3D image is converted from a 2D image. Alternatively, it is also possible to display a graphic symbol, such as an icon, as message information instead of message information by character, or make differ the window-color, pattern, etc., of the screen on which a 2D image is displayed from that of the screen on which a normal 3D image is displayed and from that on which a converted 3D image is displayed.

Here, a 2D image is converted into a 3D image so that all images are 3D images, however, it may also be possible to convert, conversely, a 3D image into a 2D image so that all images are 2D images when a device that outputs an image is not compatible with a 3D image or when a viewer intentionally selects a display of a 2D image. In this case also, before outputting the image, a character "3D->2D" is superimposed on the 3D image after conversion so that a viewer can see that the 2D image is converted from a 3D image.

(Step S607) The 3D image or the 3D image newly converted from a 2D image is output from the image output part 326 via the output terminal 109 and the video cable 110 and thus the 3D image is displayed on the television 104. The 3D image is displayed in the same manner as that explained with reference to FIG. 2.

(Step S608) Whether or not a user has operated the operation panel 325 to end the operation before all of the images are displayed in the slide show is determined and when the operation is ended, the flowchart proceeds to step S611.

(Step S609) Whether or not the image is the last one to be displayed in the slide show is determined and when it is the last image, the flowchart proceeds to step S611.

(Step S610) When there remains an image(s) to be displayed in the slide show, the next image is read and the flowchart returns to step S605.

(Step S611) End the slide show.

Figure 7:
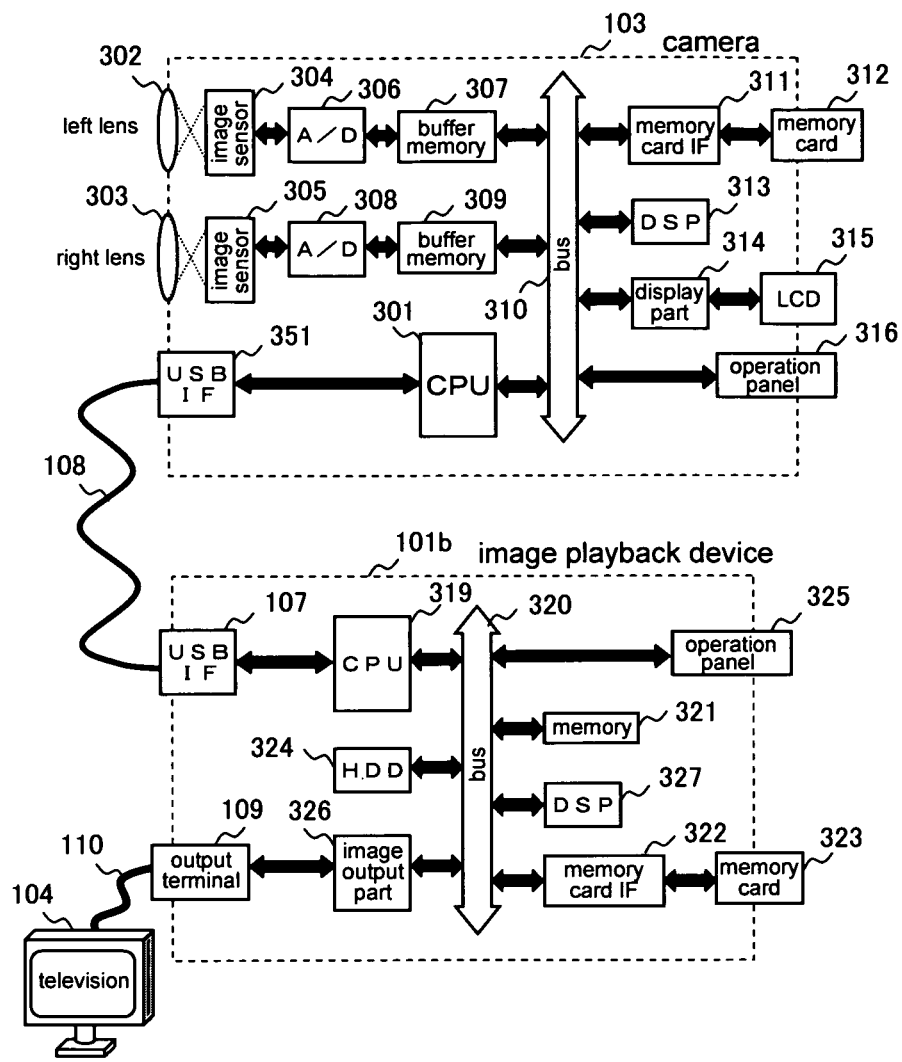
FIG. 7 is a block diagram showing a configuration of a camera 103 and an image playback device 101b.

In the present embodiment, the case of the wireless connection between the camera 102 and the image playback device 101 is explained in FIG. 1, however, it may also be possible to couple the camera 103 and the image playback device 101 by a wire, such as a USB interface. In this case, as shown in FIG. 7, instead of the transmitting and receiving part 318 and the antenna 105 of the image playback device 101 and the transmitting and receiving part 317 and the antenna 106 of the camera 102 in FIG. 3, the camera 103 is provided with a USBIF (interface) 351 and the image playback device 101b is provided with the USBIF 107, respectively, and thus communication is established by coupling both by the USB cable 108. Consequently, only the communication medium is different and the operation is the same as that shown in the flowchart in FIG. 4 for transmitting an image from the camera 102 to the image playback device 101 and that shown in the flowchart in FIG. 5 for carrying out the slide show with the image playback device 101. The interface is not limited to the USB interface, but the RS232C standard compliant interface, the IEEE1394 standard compliant interface, or the LAN interface may be used.

In the present embodiment, the case of the wireless connection between the camera 102 and the image playback device 101 or the connection between the camera 103 and the image playback device 101b by a wire is explained, however, the function of the image playback device may be integrated in the camera. In this case, it is possible to display a slide show by directly coupling the camera to the television 104 or to display and appreciate a slide show by displaying the slide show on a liquid crystal monitor 315 of the camera 102.

As described above, when displaying images mixedly including 2D images and 3D images in a slide show, the 2D images are converted into new 3D images and then displayed, and thereby, a viewer can appreciate the slide show without a feeling of difference or tiring his/her eyes because it is unlikely that a 2D image changes to a 3D image or conversely, from a 3D image to a 2D image on the screen during the period of the slide show. In addition, it is possible for the viewer to easily confirm that the displayed image is a 3D image converted from a 2D image or the image is a 2D image converted from a 3D image by way of a character, graphic symbol such as an icon, or the window-color or pattern of the screen.

In the present embodiment, in steps S605 and S606 in FIG. 5, the 2D image is converted into the 3D image, however, if steps S605 and S606 are eliminated but the images are sorted according to the 2D images and the 3D images in step S603, the 2D images and the 3D images are output in serial order, and therefore, the changing has to occur only once and as a result, it is possible to lessen the fatigue of the eyes of the viewer compared to the case where images are displayed in a slide show in order of randomly arranged 2D images and 3D images.

Second Embodiment

Next, an image playback device according to a second embodiment of the present invention is explained. The configuration of the connection between the camera 102 and the image playback device 101 is the same as that in the first embodiment shown in FIG. 3. The image playback device 101 in the present embodiment is newly provided with a function to convert a 2D image into a new 3D image on the side of the camera 102 and the image playback device 101 temporarily stores images received in a memory or displays a slide show while receiving the images.

Figure 8:
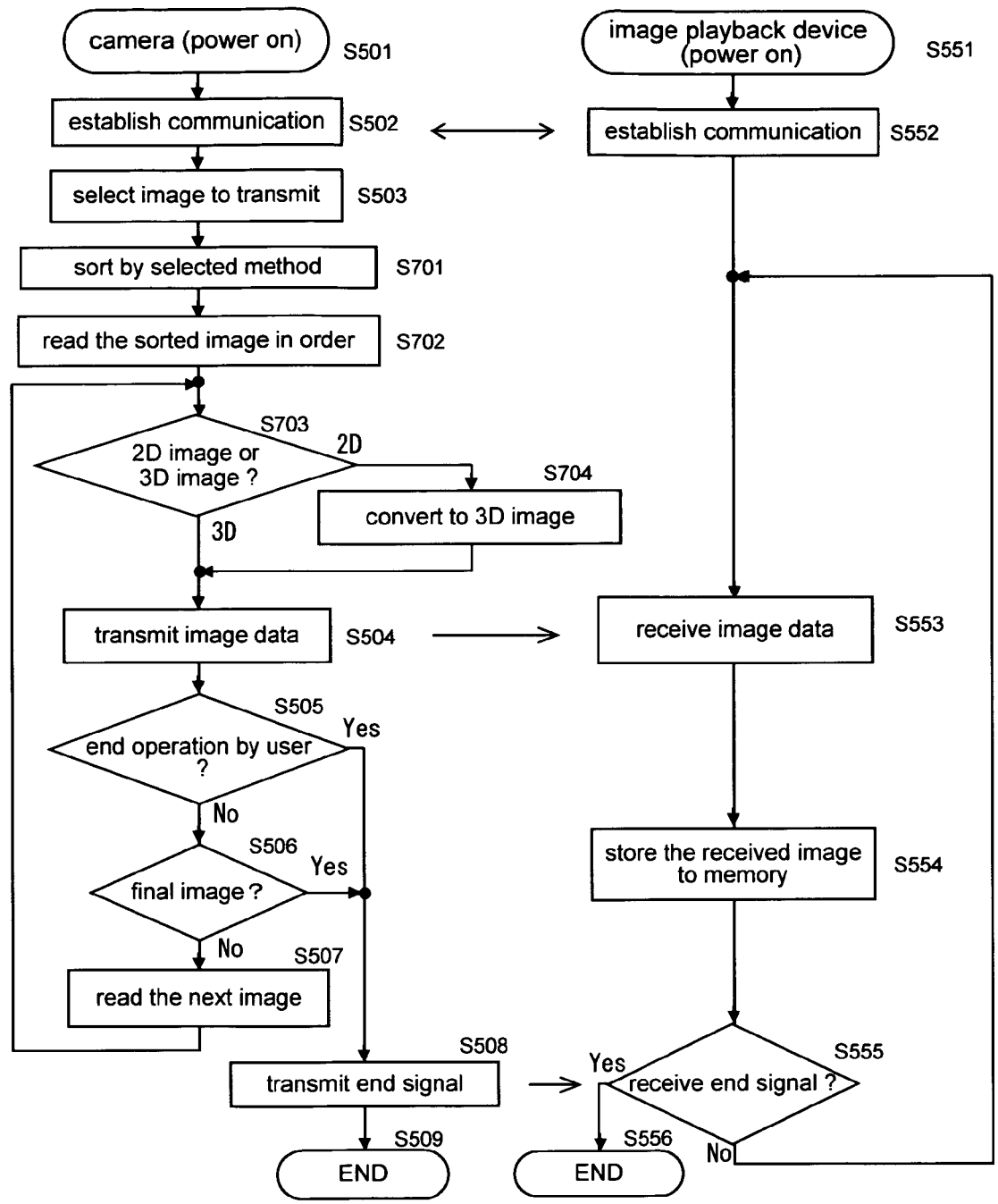
FIG. 8 is a flowchart showing an operation of the image playback device 101 according to a second embodiment.

The operation of the camera 102 and the image playback device 101 in the present embodiment is explained using the flowchart in FIG. 8.

In FIG. 8, the processing with the same number as that in FIG. 4 is the same processing and therefore its explanation is omitted. Steps S501 to S503 are the same and the state is brought about where the images to transmit have been selected.

(Step S701) As in step S603 in FIG. 5, the selected images are sorted by a specified method. That is, the images are sorted according to the 3D image and the 2D image or sorted according to the shooting time zone of every hour.

(Step S702) The images sorted in step S701 are read in order.

(Step S703) Whether the read image is a 2D image or a 3D image is determined and when it is a 2D image, the flowchart proceeds to step S704.

(Step S704) As in step S606 in FIG. 5, the 2D image is converted into a pseudo 3D image based on a predetermined calculation. This processing is carried out by the DSP 313.

The subsequent processing is the same as that in the flowchart in the first embodiment in FIG. 4, in which the images are transmitted in step S504 and the operation is continued until the user carries out the end operation or all of the images are transmitted.

As described above, the 2D image is converted into a new 3D image on the side of the camera 102 and then it is transmitted to the image playback device 101, and therefore, the processing load of the image playback device 101 can be lightened. In the processing flow in the present embodiment shown in FIG. 8, the receiving images are temporarily stored in the memory 321, however, the receiving images may be displayed without any operation in a real time slide show. Alternatively, it may also be possible to appreciate a slide show by displaying the slide show on the liquid crystal monitor 315 of the camera 102.

As in the first embodiment, when displaying images mixedly including 2D images and 3D images in a slide show, the 2D images are converted into new 3D images and then displayed, and thereby, a viewer can appreciate the slide show without a feeling of difference or tiring his/her eyes because it is unlikely that a 2D image changes to a 3D image or conversely, from a 3D image to a 2D image on the screen during the period of the slide show.

Third Embodiment

Next, an image playback device according to a third embodiment of the present invention is explained. The configuration of the image playback device itself is the same as that of the image playback device 101 in the first embodiment in FIG. 3 and that of the image playback device 101b in FIG. 7. However, in the present embodiment, the processing in step S605 and S606 in FIG. 5 is different and is carried out as follows.

(Step S605) Whether or not the read image has changed from the 2D image to the 3D image is determined and when the 2D image has changed to the 3D image, the flowchart proceeds to step S606, otherwise when the 2D image or the 3D image remains unchanged, the flowchart proceeds to step S607.

(Step S606) When the read image has changed from the 2D image to the 3D image, only one of a pair of parallax images forming the 3D image is output for a brief time and then the flowchart proceeds to step S607. In step S607, the other parallax image is also output and as a result, the image is output as a 3D image. The subsequent operations are the same as those in FIG. 5, and therefore, their redundant explanation is omitted.

Figure 9:
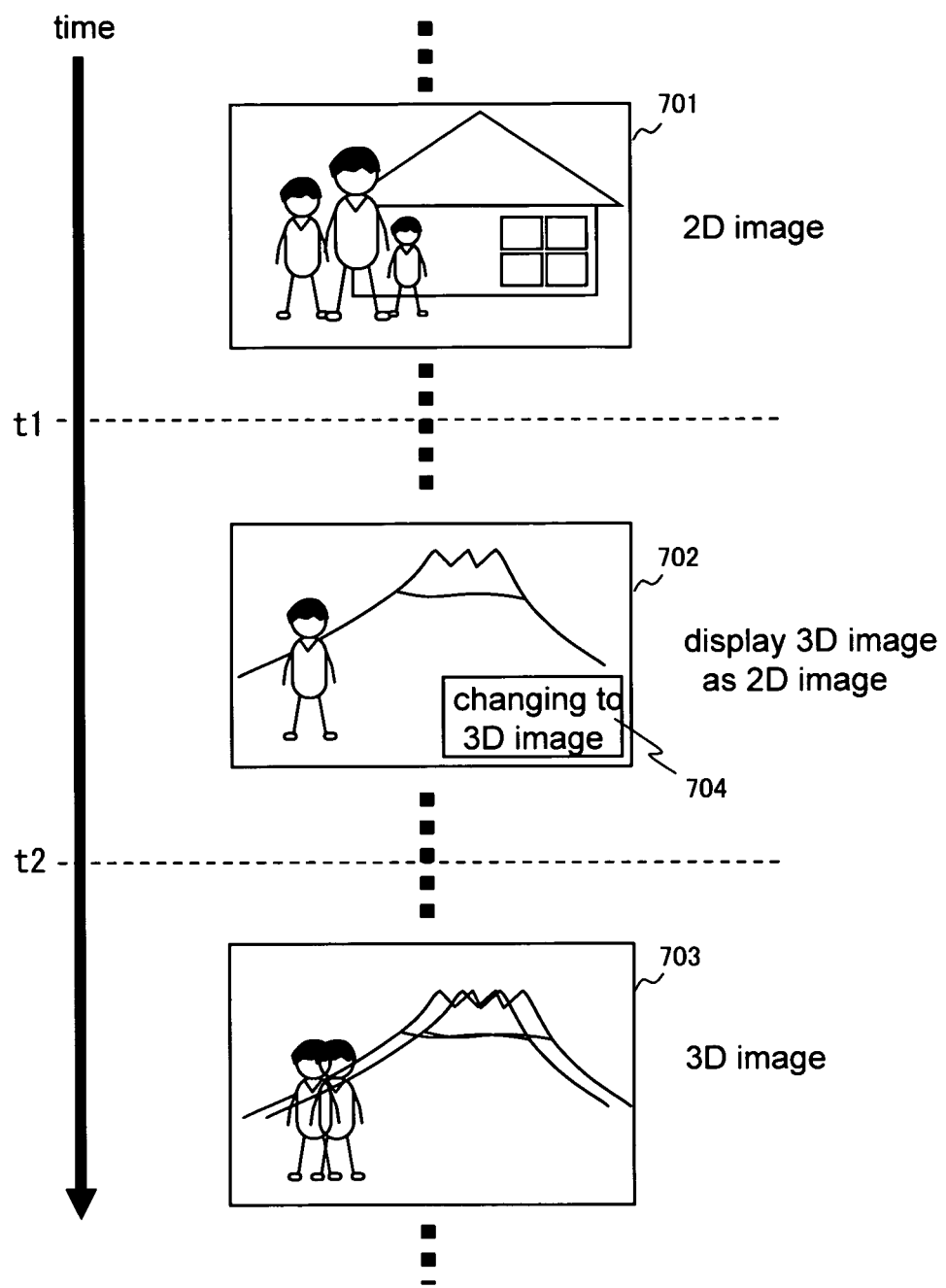
FIG. 9 is an explanatory diagram showing a display screen when a 2D image changes to a 3D image.

Here, how an image is displayed in the present embodiment is explained using FIG. 9. FIG. 9 shows how an image is displayed on the television 104 when time elapses from top to bottom. It is assumed that until time t1 is reached, a 2D image 701 is displayed. Next, if the image to be displayed next is a 3D image, whether the 2D image has changed to the 3D image is determined in step S605 described earlier and an image 702, which is any one of the pair of parallax images forming the 3D image is displayed on the television 104 between time t1 to time t2 in step S606. At this time, the CPU 319 of the image playback device 101 synthetically displays message information 704, "this image changes to a 3D image", on the screen to be displayed on the television 104. After a predetermined period of time elapses and time t2 is reached, a 3D image 703 including the other parallax image forming a pair with the image 702 is displayed on the television 104.

In this manner, when displaying images mixedly including 2D images and 3D images in a slide show, any one of the pair of parallax images forming the 3D image is displayed as a 2D image and then after a while, the 2D image is caused to change to a 3D image, thereby, it is possible for a viewer to gradually accustom his/her eyes to the image and thus a feeling of difference at the time of changing can be alleviated at the point of changing from the 2D image to the 3D image. In particular, by displaying message information to the effect that the image will change to a 3D image from now, the viewer can psychologically prepare for the change. Displaying message information, such as "wear the 3D eyeglasses 111", will prompt the viewer to prepare the 3D eyeglasses 111, and thus a more effective result can be obtained. It may also be possible to display a graphic symbol, such as an icon, as message information instead of message information by character, or make the window-color or pattern of the screen on which the a 2D image is displayed differ from that on which a 3D image is displayed.

Figure 10:
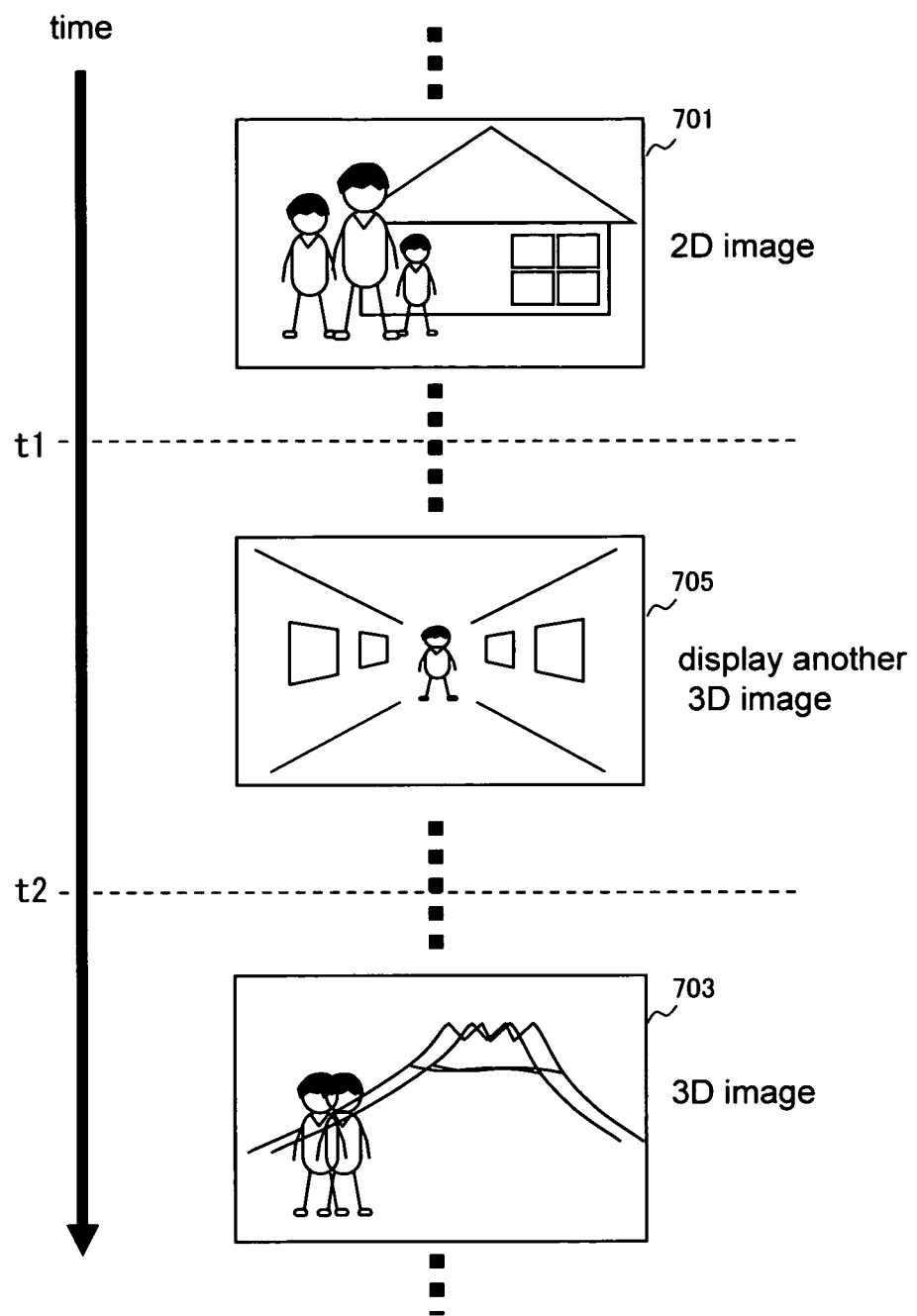
FIG. 10 is an explanatory diagram showing a display screen when a 2D image changes to a 3D image.

When a 2D image changes to a 3D image, it may also be possible to display another 3D image 705 between time t1 and time t2 as shown in FIG. 10, instead of displaying any one of the pair of parallax images forming the 3D image as a 2D image. Particularly, in this case, it is preferable to insert a perspective image, because with a perspective image it is easy for the viewer to easily accustom his/her eyes to a 3D image. It may also be possible to reset the sense of sight of the viewer by inserting a white screen or a black screen as the image 705.

In addition, it may also be possible to change the image effect displayed in a slide show when a 2D image changes to a 3D image or when a 3D image changes to a 2D image. For example, it may also be possible to increase the speed to sliding in and sliding out of a 2D image and reduce the speed to sliding in and sliding out of a 3D image by providing two kinds of speed to sliding in/out. Further, it may also be possible to use the sliding in from the left when a 2D image changes to a 3D image and use the sliding in from the right when a 3D image changes to a 2D image by providing two kinds of method of sliding in and sliding out. It may also be possible to change the parameter of with or without zooming processing to enlarge part of an image to be displayed etc. besides the image effect of the sliding in and sliding out.

It may also be possible to make the image effect during the period of display of a 2D image differ from the image effect during the period of display of a 3D image, not only when a 2D image changes to a 3D image. It may also be possible to, for example, produce the image effect of a sepia tone during the period of display of a 2D image or produce the star-cross image effect during the period of display of a 3D image.

In this manner, when a 2D image changes to a 3D image or when a 3D image changes to a 2D image, it is possible for a viewer to know the change of the kinds of image in advance and to psychologically prepare for the change by changing the image effect to be displayed in a slide show.

Fourth Embodiment

Next, an image playback device according to a fourth embodiment of the present invention is explained. The configuration of the image playback device itself is the same as that of the image playback device 101 in the first embodiment shown in FIG. 3 and that of the image playback device 101b shown in FIG. 7. In the present embodiment, the file operation of 3D images and 2D images is explained, such as the sorting processing described in the above-mentioned embodiments.

Figure 11A:
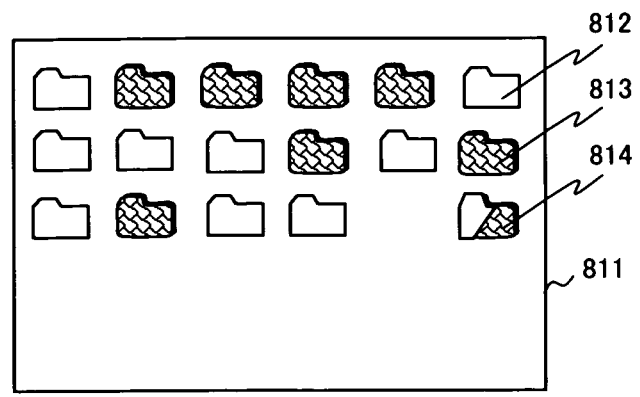
FIGS. 11(a) to 11(c) are explanatory diagrams showing a folder operation of the image playback device 101 according to a third embodiment.

FIG. 11 depicts the screen of the television 104 at the time of the file operation. FIG. 11(a) shows a screen 811 on which folders that store 2D images and 3D images are displayed and a folder icon 812 shown only by a line drawing denotes a folder that stores only 2D images and a stereoscopic folder icon 813 with shadow denotes a folder that stores only 3D images. Further, a folder icon 814 part of which is shown by a line drawing and the rest of which is stereoscopic with shadow denotes a folder that stores 2D images and 3D images mixedly.

Figure 11B:
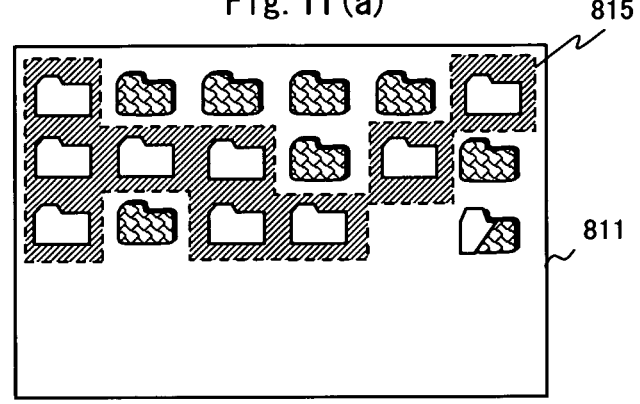
Figure 11C:
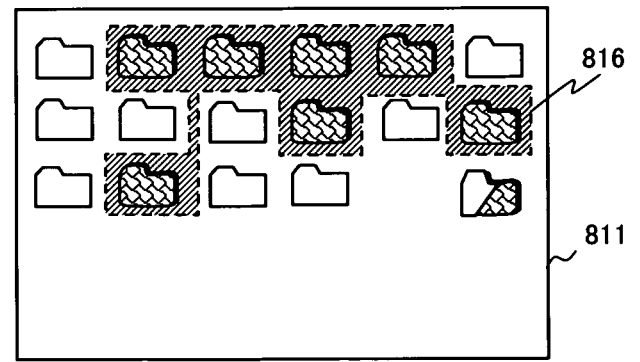

Here, if a user operates the operation panel 325 of the image playback device 101 and specifies selection of a folder that stores only 2D images on the screen 811 displayed in FIG. 11(a), the CPU 319 selects all of the folder icons 812 that store only 2D images on the screen 811. In FIG. 11(b), the part with shadow surrounded by a dotted line 815 denotes the selected folder icons 812 that store only 2D images. On the contrary, FIG. 11(c) shows a case where selection of the folders that store only 3D images is specified and the CPU 319 selects all of the folder icons 813 that store only 3D images on the screen 811. The part with shadow surrounded by a dotted line 816 denotes the selected folder icons that store only 3D images. Similarly, it is also possible to select the folder icons 813 that store 2D images and 3D images mixedly.

As described above, by displaying different folder icons for the folder that stores only 2D images, the folder that stores only 3D images, and the folder that stores 2D images and 3D images mixedly, it is possible for a user to easily see in which folder 2D images or 3D images are stored only by glancing the screen on which the folder icons are displayed. In addition, because the folders that store only 2D images, the folders that store only 3D images, etc., having the same image form can be selected en bloc, it is made easier to move or copy the images of the same form.

Next, a case of operating the screen on which image files are displayed is explained using FIG. 12. FIG. 12(a) shows a screen 821 on which image files that store 2D images and 3D images are displayed. As attribute information, 2D or 3D is added as an extension, and information about the type of an image, that is, a 2D image or 3D image is displayed in the "Type" column.

Here, if a user operates the operation panel 325 of the image playback device 101 and specifies selection of only 2D images on the screen 821 displayed in FIG. 12(a), the CPU 319 selects all of the 2D images only on the screen 821. The parts with shadow surrounded by dotted lines 822, 823, and 824 in FIG. 12(b) denote the selected 2D image files. On the contrary, FIG. 12(c) shows a case where selection of only 3D images is specified and the CPU 319 selects all of the 3D images only on the screen 821. The parts with shadow surrounded by dotted lines 825, 826, and 827 denote the selected 3D image files.

As described above, by adding different extensions to the 2D image and 3D image, it is possible for a user to easily see that a displayed file is for the 2D image or the 3D image. In addition, because only the 2D image files or the 3D image files can be selected en bloc by the operation of a user, it is made easier to move or copy the images of the same form simultaneously.

Here, the 3D image file is explained. As explained in FIG. 2, the 3D image in the present embodiment is made up of a pair of parallax images. Consequently, two parallax images are necessary for the right eye and for the left eye, respectively, and there can be thought a method in which two different image files are created and a method in which one image file is created when the 3D image is put into a file(s). The 3D image files in FIG. 12 described above are created by the method in which one image file is created, and for example, in the 3D image file def.3D surrounded by the dotted line 825 in FIG. 12(*c*), two parallax images for the right eye and the left eye are stored and information to separate the two parallax images is added to the image file so that the CPU 319 can separate the two parallax images when reading the 3D image file def.3D.

On the other hand, by the method in which two different image files are created for two parallax images for the right eye and the left eye, for example, as shown in FIG. 13, on a screen 831 on which image files are displayed, an image file 832 def.3DL the extension of which is 3DL and an image file 833 def.3DR the extension of which is 3DR are displayed as if they were two different image files. In this case, when reading the 3D image file, the CPU 319 searches for the files with the same name "def" except for their extensions and reads the file with the extension 3DL as the file for the left eye and the file with the extension 3DR as the file for the right eye, respectively, and then displays a 3D image.

Next, a method of searching for images by making use of a correlation of images is explained. For example, when a user operates the operation panel 325 of the image playback device 101 and instructs to search for an image, the CPU 319 searches for an image by making use of a correlation as it is for the file of the 2D image but searches for an image by taking only one of the pair of parallax images as a retrieval object for the file of the 3D image. In this case, for the 3D image file for which only one image file has been created for two parallax images for the right eye and the left eye as explained in FIG. 12, only the data of one side image of the image file is searched for. Alternatively, for the 3D image file for which two different image files have been created for two parallax images for the right eye and the left eye as explained in FIG. 13, for example, only the image file with the extension 3DL is searched for but the image file with the extension 3DR is not taken as a retrieval object.

As described above, when an image is searched for from among image files mixedly including 2D images and 3D images, by taking only one of the pair of parallax images of the 3D image as a retrieval object, the image search time can be reduced. Although it may also be possible to take all of the two parallax images as a retrieval object, the pair of parallax images are images between which a correlation exists, and therefore, by taking any one of them as a retrieval object, the search result equivalent to that when the two parallax images are taken as a retrieval object can be obtained.

Figure 14A:
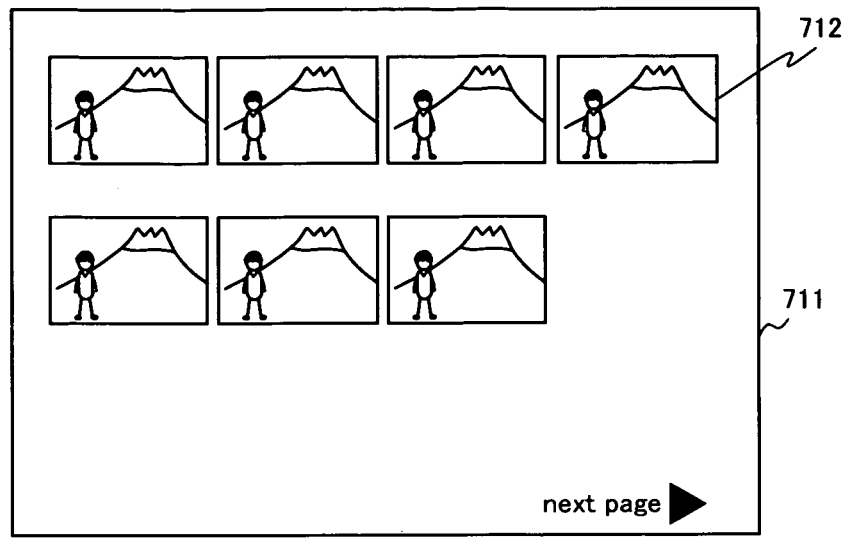
FIGS. 14(a) and 14(b) are explanatory diagrams showing a thumbnail display.
Figure 14B:
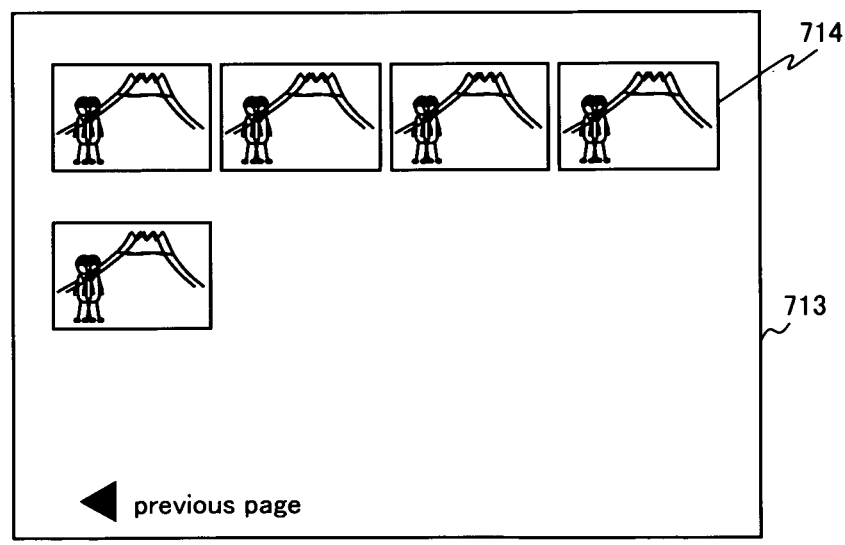

Next, a case where sorted or retrieved images are displayed in a thumbnail is explained using FIG. 14. FIG. 14(*a*) shows a screen 711 on which only 2D images 712 are displayed in a thumbnail on the television 104 and FIG. 14(*b*) shows a screen 713 on which only 3D images 714 are displayed in a thumbnail on the television 104. For example, when a user operates the operation panel 325 of the image playback device 101 and instructs a thumbnail display of the image file list mixedly including 2D images and 3D images as shown in FIG. 12(*a*), the CPU 319 extracts only the 2D images from the image file list of the screen 821 and displays thumbnail images of only the 2D images as shown in FIG. 14(*a*) on the television 104. The thumbnail of the 3D image is displayed in the next screen, that is, only the 3D images are displayed on one screen, as shown in FIG. 14(*b*). At this time, for example, when there are seven 2D images and five 3D images having a screen size with which 12 thumbnail images can be displayed on one screen, the seven 2D images are displayed in a thumbnail on one screen and the space corresponding to the five images is left blank as shown in FIG. 14(*a*) and the five 3D images are displayed on the next screen as shown in FIG. 14(*b*).

As described above, when an image file list mixedly including 2D images and 3D images is displayed in a thumbnail, the 2D images and the 3D images are displayed separately on different screens, and therefore, the eyes of a viewer will not be tired. In particular, at the time of a thumbnail display of 3D images, if the viewer wears the 3D eyeglasses 111, it is possible for the viewer to appreciate the thumbnail display as 3D images.

In each of the embodiments, the case where 3D images are viewed with red and blue eyeglasses worn is explained, however, methods of obtaining a 3D image include a method that utilizes polarized light, a method in which eyeglasses with liquid crystal shutter are worn, a method of specially machining a display itself of a television so that the display causes parallax, etc. Even for such a 3D image, the same effect as that of the present embodiments can be obtained by processing image data in the same manner. In particular, when 3D images by different methods exist mixedly, it may also be possible to sort the 3D images according to their kinds when the sorting explained in each of the embodiments is carried out.

As above, the present invention is explained in detail, however, the above embodiments and their modification examples are only exemplary ones and the present invention is not limited to those. It is obvious that there can be various modification examples without departing from the scope of the present invention.

The many features and advantages of the embodiments are apparent from the detailed specification and, thus, it is intended by the appended claims to cover all such features and advantages of the embodiments that fall within the true spirit and scope thereof. Further, since numerous modification and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image playback device, comprising:
   a storage part in which a mix of a plurality of 2D images and a plurality of 3D images are stored, each of the 3D images is obtained by synthesizing a pair of parallax images;
   an image conversion part that synthesizes a pair of parallax images generated from one of said 2D images stored in said storage part and converts the pair of parallax images into one new 3D image; and an image output part that outputs said 3D image stored in said storage part and said new 3D image converted by said image conversion part.

2. The image playback device according to claim 1, wherein
said image output part outputs an image along with information indicative of that the image is a converted image when the image is one of a 3D image converted from a 2D image and a 2D image converted from a 3D image.

3. The image playback device according to claim 2, wherein
said information is at least one of character, icon, window-color and pattern.

4. An image playback device, comprising:
a storage part in which a mix of a plurality of 2D images and a plurality of 3D images are stored, each of the 3D images is obtained by synthesizing a pair of parallax images;
a sorting part that sorts said 2D image and said 3D image stored in said storage part; and
an image output part that outputs said 2D image and said 3D image according to an order of sorting result by said sorting part.

5. The image playback device according to claim 4, wherein
said sorting part sorts according to the date and time and the time zone when said 2D image and said 3D image are stored in said storage part.

6. An image playback device, comprising:
a storage part in which a mix of a plurality of 2D images and a plurality of 3D images are stored, each of the 3D images is obtained by synthesizing a pair of parallax images; and
an image output part that has at least two kinds of image effect when outputting an image and outputs an image using said different kinds of image effect for said 2D image and said 3D image.

7. The image playback device according to claim 6, wherein
said image output part changes said image effect one of when outputting an image at the point of changing from said 2D image to said 3D image and when outputting an image at the point of changing from said 3D image to said 2D image.

8. The image playback device according to claim 7, wherein
said two kinds of image effect that said image output part has differ from each other at least in one of parameters of time period to output, speed to sliding in or out, with or without zooming processing, and conversion speed from 2D to 3D.

9. The image playback device according to claim 6, wherein
said two kinds of image effect that said image output part has differ from each other at least in one of parameters of time period to output, speed to sliding in or out, with or without zooming processing, and conversion speed from 2D to 3D.

10. An image playback device, comprising:
a storage part in which a mix of a plurality of 2D images and a plurality of 3D images are stored, each of the 3D images is obtained by synthesizing a pair of parallax images; and
an image output part that outputs an image in such a manner that said 3D image immediately after the point of changing from said 2D image to said 3D image is gradually turning into said 3D image after outputting it as a 2D image.

11. The image playback device according to claim 10, wherein
said image output part inserts a third image before outputting an image at the point of changing between said 2D image and said 3D image.

12. The image playback device according to claim 11, wherein
said third image inserted by said image output part is caused to be one of a black screen and white screen.

13. An image playback device, comprising:
a storage part in which a mix of a plurality of 2D images and a plurality of 3D images are stored, each of the 3D images is obtained by synthesizing a pair of parallax images; and
an image output part that changes, before outputting said 2D image and said 3D image stored in said storage part in a thumbnail or outputting a plurality of images on one screen, the images to those of the same type, one of the 2D image and the 3D image.

14. An image playback device, comprising:
a storage part in which a mix of a plurality of 2D images and a plurality of 3D images are stored, each of the 3D images is obtained by synthesizing a pair of parallax images;
an image search part that searches for an image by taking only one of said pair of parallax images of said 3D image as a retrieval object and by using a correlation of images; and
an image output part that outputs the image that said image search part has searched for.

15. An image playback device, comprising:
a storage part in which a mix of a plurality of 2D images and a plurality of 3D images are stored, each of the 3D images is obtained by synthesizing a pair of parallax images;
an image search part that searches for said pair of parallax images of said 3D image as two distinct images by using a correlation of images; and
an image output part that outputs the image that said image search part has searched for.

16. An image playback device, comprising:
a storage part in which a plurality of 2D images and a plurality of 3D images are stored, each of the 3D images is obtained by synthesizing a pair of parallax images; and
an image output part that outputs a folder in which each image stored in said storage part is stored as an icon, wherein:
said image output part outputs different icons for a folder in which only 2D images are stored, a folder in which only 3D images are stored, and a folder in which 2D images and 3D images exist mixedly.

17. An image playback device, comprising:
a storage part in which a plurality of 2D images and a plurality of 3D images are stored, each of the 3D images is obtained by synthesizing a pair of parallax images;
an image output part that brings together and outputs the 3D image images stored in said storage part and brings together and outputs the 2D images stored in said storage part; and
an image selection part that selects only the 2D images stored in said storage part or selects only the 3D images stored in said storage part.

* * * * *

UNITED STATES PATENT AND TRADEMARK OFFICE
CERTIFICATE OF CORRECTION

| | |
|---|---|
| PATENT NO. | : 8,417,023 B2 |
| APPLICATION NO. | : 12/226772 |
| DATED | : April 9, 2013 |
| INVENTOR(S) | : Setsu Mitsuhashi et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,049 days.

Signed and Sealed this
Third Day of September, 2013

Teresa Stanek Rea
*Acting Director of the United States Patent and Trademark Office*